United States Patent [19]

Lalonde

[11] Patent Number: 5,477,040
[45] Date of Patent: Dec. 19, 1995

[54] STRUCTURE FOR A METHOD OF FACILITATING CHARGE TRANSACTIONS

[76] Inventor: Michael G. Lalonde, 37825 Mallast, Harrison Township, Mich. 48045

[21] Appl. No.: 247,587

[22] Filed: May 23, 1994

[51] Int. Cl.$^6$ .................................................. G06K 5/00
[52] U.S. Cl. ........................ 235/380; 235/379; 235/487; 235/492
[58] Field of Search ................................ 235/379, 380, 235/487, 492; 283/112

[56] References Cited

U.S. PATENT DOCUMENTS

| | | | |
|---|---|---|---|
| 4,593,936 | 6/1986 | Opel | 283/112 |
| 4,736,094 | 4/1988 | Yoshida | 235/379 |
| 5,259,025 | 11/1993 | Monroe | 235/380 |

*Primary Examiner*—Harold Pitts

[57] ABSTRACT

Structure for and method of facilitating charge transactions by the holder of a plurality of charge cards, issued by a plurality of separate charge card issuers, utilizing a single universal charge card selector card, facilitating card holder reconciliation of card holder receipts and a consolidated statement, and providing the universal card holder with a single consolidated statement for all of the card holder's charge transactions during a statement period. The structure for facilitating the charge transaction includes a charge card selector card, having card holder, charge card selector, and a plurality of separate charge card issuers' data thereon, point of charge transaction means at a charge card accepting merchant, means for transferring identification and charge transaction data from the point of charge transaction means to point of charge card selection means at a charge card selector, point of charge card selection means for selecting a predetermined charge card for the charge transaction, and transferring identification data to the charge card issuer of the selected charge card, point of credit authorization means at the charge card issuer, including means for generating credit authorizing data and transferring the identification and credit authorizing data to the charge card accepting merchant through the charge card selector. The method of the invention includes the steps of obtaining a charge card selector card and presenting it to a charge card accepting merchant, presenting identification and charge transaction data to the charge card selector by the merchant, selection of a predetermined charge card issuer by the charge card selector, obtaining credit authorization from the selected charge card issuer by the charge card selector and transferring the credit authorization data back to the merchant.

17 Claims, 6 Drawing Sheets

STRUCTURE FOR A METHOD OF FACILITATING CHARGE TRANSACTIONS

BACKGROUND OF THE INVENTION

1. Field of the Invention

The invention relates to making charge transactions by the holder of a plurality of charge cards issued by a plurality of different charge card issuers, periodic reconciliation of receipts representing the charge transactions made utilizing the charge cards with periodic statements from each of the charge card issuers and ultimate settlement of the statements and refers more specifically to a structure for and method of making charge transactions utilizing a single charge card selector card which charge transactions may be charged to any of the card holder's charge cards in accordance with the card holder's preferences and the charge card issuer's interest rates, credit limits and promotions, including means for and the steps of providing the card holder with sequentially numbered receipts and a single consolidated statement including all charge transactions sequentially numbered for easy reconciliation and further including means for and the steps of settlement of the consolidated statement with a single charge card selector who settles with charge card issuers, taking into consideration the card holder's preferences and charge card issuer's minimum payment requirements.

2. Prior Art

Currently, the holder of a plurality of charge cards from a plurality of different charge card issuers initiates a charge transaction at a charge card accepting merchant by carrying a plurality of charge cards and when it is desired to charge a purchase, selecting a particular charge card to which the charge transaction is to be charged and presenting the merchandise and selected charge card to the merchant.

The charge card accepting merchant then obtains card holder and card issuer identification data from the charge card and generates merchant identifying data and charge transaction data all of which data the merchant transfers to a data processor.

The data processor generates the processor's identification data and transfers all the identification and charge transaction data to the issuer of the selected charge card.

The issuer of the selected charge card generates credit authorization data which is transferred back to the charge card accepting merchant typically through the data processor along with required identification data to route the credit authorization data back to the merchant. Credit authorization may be made directly to the merchant and/or be directed to the charge card issuer from the merchant.

Providing credit is authorized, the charge card accepting merchant then provides the card holder with the transaction merchandise, a customer receipt having the charge transaction and card issuer identification data thereon and returns the selected charge card to the card holder.

The charge card accepting merchant and the data processor may reconcile the number of transactions between them and the dollar value of the transactions at the end of each day. Settlement between the charge card accepting merchant and the data processor may also be accomplished on a daily basis through electronic funds transfer.

Ultimately on a periodic basis, the card holder of the plurality of charge cards will receive a statement from each of the separate charge card issuers whose charge card the card holder has selected during the statement period. The card holder must then reconcile his charge transaction receipts with the several statements from the plurality of charge card issuers, which statements may come at different times and may have different formats of information and dates for a given charge transaction, and provide each separate charge card issuer with a separate payment to settle each of the statements.

Such current structure for and method of making charge transactions requires the card holder to carry a plurality of charge cards and to make a selection of a preferred card for each separate charge transactions. In addition, the card holder should laboriously reconcile a plurality of uncoordinated receipts with a number of uncoordinated statements and make separate payments to each of the charge card issuers. No card holder credit limit nor minimum payment protection is provided by the present structure and method and charge card issuer's lowest interest rates and preferred promotions are often unknown and are not taken advantage of automatically.

Each charge card issuer must have structure for and periodically produce a statement for each of their charge card holders and for accepting payment from each of their charge card holders.

In summary, prior structure for and method of making charge transactions is undesirable in a number of respects. A charge card holder feels it is desirable to carry a number of charge cards at all times. The structure for and method of facilitating a charge purchase as it exists today does not provide structure for nor a method of sequentially numbering card holders receipts so that reconciliation of the receipts with statements when they arrive can be readily accomplished. Further, consolidated statements are not possible with the present structure for and method of making charge transactions and the charge card issuers must deal with individual payments from each of their individual charge card holders.

Further, the structure for and method of effecting a charge transaction currently does not allow for preselected card preference and does not permit automatic switching of a charge transaction between a card holder's charge cards to obtain the most advantageous use of the card holder's charge cards. It similarly does not permit automatic shifting of charge transactions to prevent over-credit limit charges or shift payments to take advantage of credit balances or extended credit lines to automatically pay minimum payments. In addition, loss of a plurality of charge cards simultaneously for whatever reason, creates a necessity for contacting each separate card issuer to cancel the charge cards and to obtain new charge cards.

Many charge card holders resent the necessity of carrying a plurality of charge cards at all times and do not make a detailed reconciliation of their customer receipts and statements. They do however have a vague feeling that they are paying someone else's charges periodically.

OBJECTS OF THE INVENTION

It is therefore an object of the present invention to provide structure for and a method of making charge transactions by the holder of a plurality of separate charge cards issued by a plurality of separate charge card issuers by utilizing a single charge card selector card.

It is a further object of the invention to provide structure for and a method of making charge transactions which provide a card holder with receipts which are sequentially numbered and a similarly sequentially numbered consolidated statement whereby reconciliation of the receipts and the consolidated statement is facilitated.

A still further object of the invention is to provide a structure for and method of making charge transactions whereby a single payment may be periodically made by the holder of a plurality of charge cards to settle charge transactions charged to charge cards issued by a plurality of separate charge card issuers and charge card issuers do not need to deal with each of their charge card holders.

A still further object of the present invention is to provide a structure for and method of making charge transactions including automatically selecting predetermined preferred charge cards, altering the predetermined preferences, switching preferences between charge card issuers when credit limit is exceeded on a preferred charge card ,to minimize less than minimum payment costs or to take advantage of a particular card issuer's promotion.

SUMMARY OF THE INVENTION

The present invention is a structure for and method of facilitating charge transactions including, a charge card selector card, point of charge transaction means point of charge card selection means, and a plurality of charge card issuers each including point of credit authorization means, whereby in accordance with the method of the invention a card holder of a plurality of separate charge cards issued by a plurality of separate charge card issuers may make charge transactions at a charge card accepting merchant with the charge card selector card and the charge transactions are charged to predetermined charge cards of the card holder in accordance with the card holder's predetermined preference or altered preference, interest rates and credit limits on particular charge cards, and promotions of charge card issuers.

Further, in accordance with the present invention through the use of the charge card selector card, card holder receipts for all charged transactions during a statement period are sequentially numbered and a single consolidated statement is provided the card holder at the end of a statement period having all of the charge transactions during the statement period similarly listed sequentially whereby the card holders' charge transaction receipts are readily reconciled with the consolidated statement.

More specifically, the structure with which the card holder interfaces in accordance with the structure of the invention includes a plurality of charge cards, a single charge card selecting card, merchandise which is desired to purchase with a charge transaction, separate receipts for each charge transaction, a consolidated statement of the charge transactions and a single payment for the charge transactions in a statement period.

The charge card selector card includes thereon identification data for the card holder and for the charge card selector. It may also include for each individual card holder data representing each of the charge cards issued to the card holder by the plurality of separate charge card issuers. The structure of the charge card selector card further includes structure for providing alternative charge card holder identification data depending on the orientation of the card as it is read.

The charge card selector card may also have a protected, personal identification number therein which in some modifications, such as an electronic or "smart" code, may include a personal algorithm security feature.

The point of charge transaction means at the charge card accepting merchant includes a card reader means, a voucher and customer receipt printing means, means for reconciliation of the charge transactions consummated by the charge card accepting merchant for a predetermined period and means for settling the charge card accepting merchant's accounts periodically.

The point of charge card selection means at the charge card selector includes means for receiving identification and charge transaction data from the point of charge transaction means, means for transferring to the point of charge transaction means, identification and charge transaction data, customer receipt sequential numbering data and credit authorization data, means for selecting a predetermined one of the plurality of the charge cards held by the card holder to which a charge transaction is to be charged in accordance with the card holder's preselected preference, card holder's override, charge card credit limit, charge card interest rates and issuer promotions.

The charge card selector, point of charge card selector means further includes means for generating a consolidated statement for the card holder including separate charge transactions sequentially numbered for the statement period whereby the card holder can readily reconcile sequentially numbered receipts and the consolidated statement. Structure is also provided at the charge card selecting means for receiving payment from the card holder resulting from the consolidated statement and generating a separate payment to each of the plurality of charge card issuers in accordance with the charge transactions with the particular separate charge card issuer, card holders preference, and minimum payment requirements of the separate charge card issuers.

Each charge card issuer, point of credit authorization means includes means to issue its separate charge cards to a card holder, check the card holder's credit in accordance with charge card validation and credit limit and the card holder's account, and to authorize a charge transaction utilizing the charge card. Structure for periodic reconciliation and settlement of accounts with charge card accepting merchants is also included in the point of credit authorization means.

The method of effecting a charge transaction in accordance with the invention includes the steps of the holder of a plurality of separate charge cards from a plurality of separate card issuers obtaining a charge card selector card and presenting it to a charge card accepting merchant together with merchandise it is desired to purchase and charge to a predetermined charge card.

The charge card accepting merchant reads identification data from the charge card selecting card including card holder and charge card selector identification data, generates the merchant's identification data and data representative of the charge transaction, and transfers all the data to the charge card selector.

The charge card selector receives the data from the merchant, selects the charge card to which the purchase is to be charged in accordance with the card holder's predetermined preferences, altered predetermined preferences and interest rates and credit limits of the card holder's charge cards. The charge card selector then transfers the identification and charge transaction data to the issuer of the selected charge card.

The selected charge card issuer checks the card holder's account and authorizes credit if it is warranted and passes identification charge transaction and credit authorization data back to the merchant through the charge card selector.

The merchant then returns the charge card selector card and the merchandise to the card holder along with a receipt having the charge transaction and charge card issuer information thereon which is sequentially numbered with the number of the charge transaction in a particular statement period made by the card holder and charged to any of the card holder's plurality of charge cards.

Additionally at the end of each day or some other mutually agreed upon period the merchants and the separate charge card issuers reconcile the number of charge transactions and dollar value of the charge transactions between them and may settle the charge transactions by electronic funds transfer.

Further in accordance of the method of the invention the charge card selector periodically issues a single consolidated statement to each card holder which includes all charge transactions during a statement period made utilizing the charge card selecting card with the separate charge transactions sequentially numbered in accordance with the sequential numbers on the card holder's receipts, allowing the card holder to quickly reconcile the customer receipts with the consolidated statement and to make a single payment of the consolidated statement to the charge card selector.

The charge card selector then allocates the payment of the card holder to the separate charge card issuers in accordance with the card holder's predetermined preferences or altered preferences and minimum payment requirements of the separate charge card issuers.

BRIEF DESCRIPTION OF THE DRAWINGS

Acronyms utilized in the drawings to clarify the drawings with a minimum of clutter includes.

CA—Credit Authorization
CC—Charge Card
CCAM—Charge Card Accepting Merchant
CCI—Charge Card Issuer
CCS—Charge Card Selector
CCSC—Charge Card Selector Card
CH—Card Holder
CT—Charge Transaction
D—Data
STN—Sequential Transaction Numbering Also to minimize clutter, each of the separate point of credit authorization means 14, 16, 18, 20, and 22, at the separate charge card issuers 15, 17, 19, 21, and 23, have been shown disconnected from the point of charge transaction means at the charge card merchant and the point of charge card selection means at the charge card selector. Their connections would be as shown for the selected charge card issuer 13 and its point of credit authorization means 12.

DETAILED DESCRIPTION OF THE INVENTION

Figure 1:
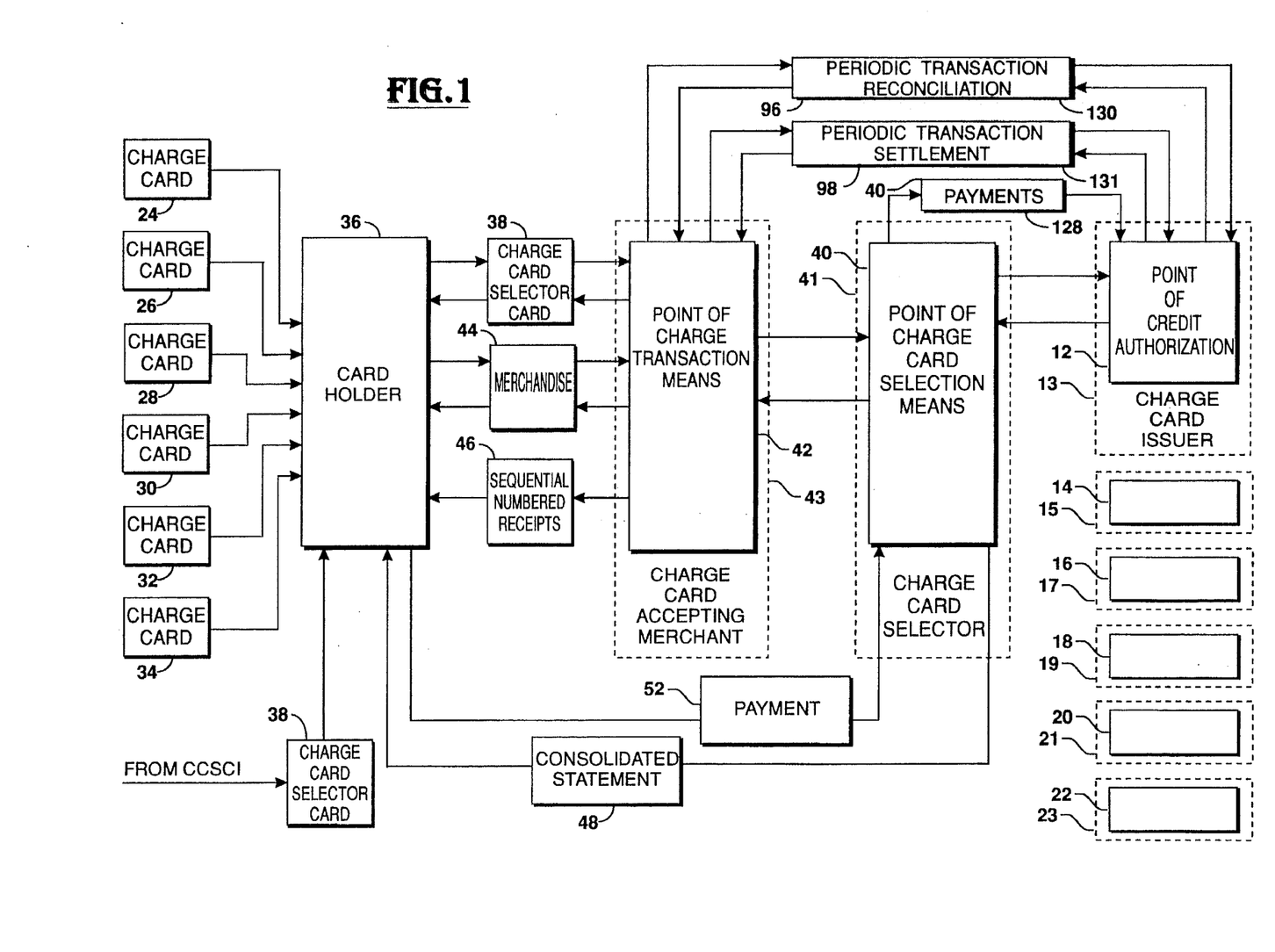
FIG. 1 is a block diagram of structure constructed in accordance with the invention for practicing the method of the invention utilizing the charge card selector card structure of the invention.

As shown best in FIG. 1 the structure for facilitating a charge transaction in accordance with the method of the invention includes a plurality of point of credit authorization means 12, 14, 16, 18, 20, and 22, each at a different charge card issuer 13, 15, 17, 19, 21, and 23, which issuers have issued separate charge cards 24, 26, 28, 30, 32, and 34, to a card holder 36. The invention further includes a charge card selector card 38 shown in detail in FIGS. 2 through 4 and point of charge transaction means 40 at charge card accepting merchant 41 and point of charge card selection means 42 at charge card selector 43, shown in detail in FIGS. 5., and 6.

The method of effecting a charge transaction in accordance with the invention includes the steps of the card holder 36 of a plurality of separate charge cards 24, 26, 28, 30, 32, and 34, from a plurality of separate charge card issuers 13, 15, 17, 19, 21, and 23, obtaining a charge card selector card 38 and presenting it to a charge card accepting merchant 41 together with merchandise 44 it is desired to purchase and charge to a selected charge card 28.

The charge card accepting merchant 41 through the point of charge transaction means 40, reads identification data from the charge card selector card 38 including card holder and charge card selector identification data, generates charge card accepting merchant's identification data and data representative of the charge transaction and transfers the data to the charge card selector 43.

The charge card selector 43 through the point of charge card selection means 42, receives the data from the point of charge transaction means 42 at the charge card accepting merchant 41, selects a charge card 28 to which the purchase is to be charged in accordance with one of the card holder's predetermined selections, altered card holder's predetermined selections, credit limits and interest rates of the card holder's charge cards and status of the card holder's account with the charge card issuer of the selected charge card, and transfers the data to the issuer of the selected charge card.

The selected charge card issuer 17 checks the card holder's account, authorizes credit if justified, and passes identification and charge transaction data and credit authorization back to the charge card accepting merchant 41 through the charge card selector 43.

The charge card accepting merchant 41 then returns the charge card selector card 38 and the merchandise 44 to the card holder 36 along with a receipt 46 having the charge transaction data thereon which is sequentially numbered with the number of the charge transaction in a particular statement period made by the card holder 36 on any of the card holder's plurality of charge cards through the charge card selector.

Additionally, at the end of each day or some other mutually agreed upon period the charge card accepting merchant 41 and charge card issuer of selected charge cards reconcile the number of their charge transactions and the dollar value of the charge transactions and may settle the transactions by electronic funds transfer.

Further in accordance with the method of the invention the charge card selector 43 periodically issues a single consolidated statement 48 to each card holder 36 which includes all of the card holder's charge transactions during a statement period, sequentially numbered in accordance with the sequential numbers on the card holder's receipts, allowing the card holder 36 to quickly reconcile his receipts with the consolidated statement 48 and to make a single payment 52 in settlement of the consolidated statement to the charge card selector 43.

The charge card selector 43 then allocates the payment to the individual charge card issuers in accordance with the card holder's predetermined selections, or altered selections, and in accordance with minimum payments required by the individual charge card issuer.

Figure 2:
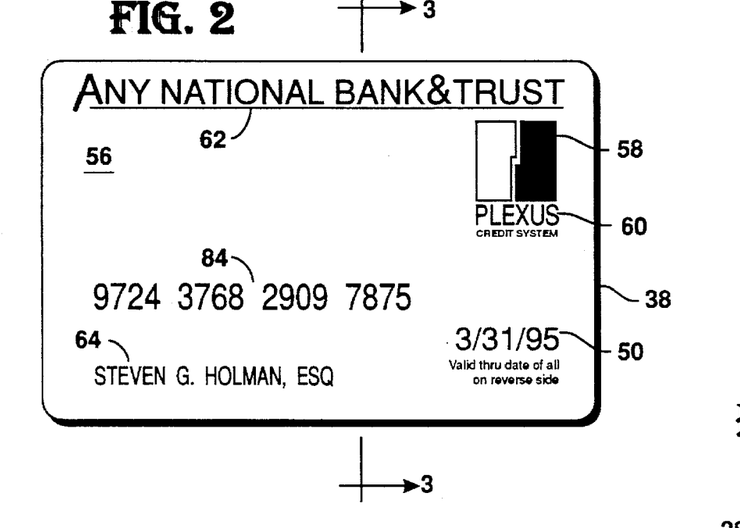
FIG. 2 is a diagrammatic representation of the front of the charge card selector card of the invention for use in the method of the invention.
Figure 3:
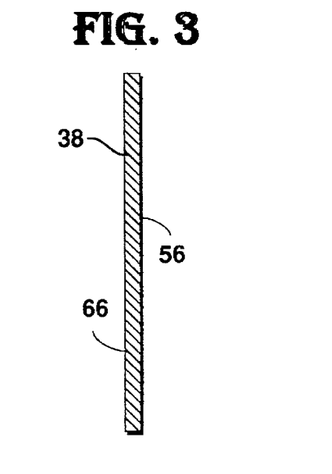
FIG. 3 is a transverse section view of the charge card selector card illustrated in FIG. 2 taken along the line 3—3 in FIG. 2.
Figure 4:
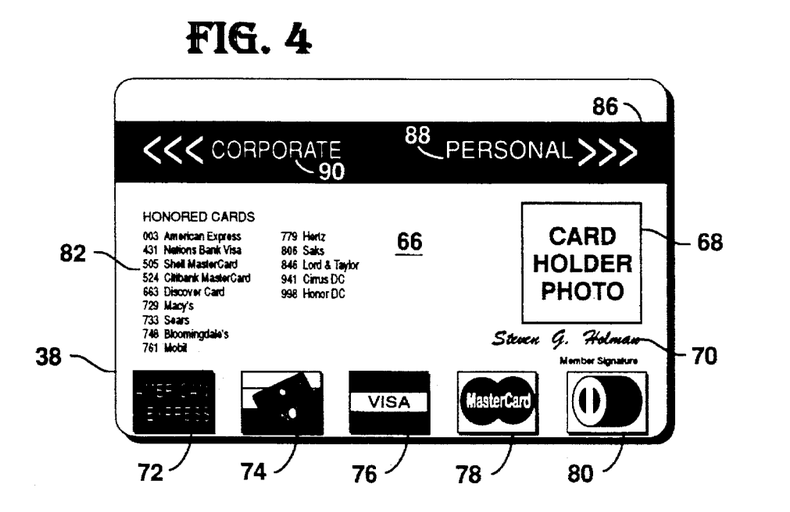
FIG. 4 is a diagrammatic representation of the back of the charge card selector card illustrated in FIGS. 2 and 3.

As set forth more particularly in FIGS. 2, 3, and 4, the charge card selector card 38 is a rectangular plastic member of wallet size similar to currently known charge cards. Identification of the charge card selector 43 is recorded on the front 56 of the charge card selector card by means of logo 58 and or name 60, as shown in FIG. 2. The issuer of the charge card selector card 38 may also be designated on the front 56 of the charge card selector card 38 by name 62, or logo, not shown. The card holder 36 may be identified on the front 56 of the charge card selector card 38 by printed name 64 and on the back 66 by the photo identification 68 and signature 70. The expiration date 50 of the charge card selector card 38 is shown on the front of the card 38.

Major charge card issuer's logo, whose charge cards are held by the card holder 36, such as logos 72, 74, 76, 78, and 80, may be provided on the back 66 of the charge card selector card 38. Additional charge card issuers 82 whose cards are held by the card holder 36 are also identified on the back of the card 38 as shown in FIG. 4. The numerical designations 84 on the front of the card 38 and the magnetic strip 86 on the back of the card provide identification data for the card holder 36 and the charge card selector 43.

As shown, coded identification data on the magnetic strip 86 includes dual card holder identification and card reader instructions whereby reading the card in one direction 88, longitudinally, of the strip will provide card holder personal identification and reading in the opposite direction 90 will provide card holder corporate or business identification.

Again, in accordance with the method of the invention, use of the charge card selector card 38 requires presentation of the card to a charge card accepting merchant 41 and ultimate receipt of the card 38 back from the merchant 41 along with merchandise 44 purchased in an authorized charge transaction. Only a single charge card selector card 38 need be carried by the card holder 36 while any given charge transaction may be charged to any of the charge cards held by the card holder in accordance with the method of the invention.

As shown in FIG. 1, the structure with which the card holder 36 is involved in accordance with the invention, includes the separate charge cards 24, 26, 28, 30, 32, and 34, which have been issued by the plurality of separate charge card issuers 13, 15, 17, 19, 21, and 23, a single charge card selector card 38, which may be issued by the charge card selector 43 or any of the plurality of card issuers with permission of the charge card selector 43, the merchandise 44 desired to be obtained through a charge transaction, sequentially numbered receipts 46 of all transactions in a statement period, periodically issued consolidated statements 48 for a statement period having all of the charge transactions made by the card holder 36 with the use of the charge card selector card 38 during the statement period sequentially numbered thereon, and a single payment 52 made out to the charge card selector 43 in settlement of the statement 48.

The method steps with which the card holder 36 is involved in completing a charge transaction or transactions over a statement period, include the presentation of the charge card selector card 38 which has previously been obtained substantially in the manner of obtaining of the charge cards held by the card holder 36, along with the merchandise 44 it is desired to purchase through the charge transaction to the charge card accepting merchant 41 and the return of the charge card selector card 38, along with the merchandise on receipt of credit authorization by the merchant 41, from a selected one of the charge card issuers 17 for example, of one of the charge cards held by the card holder 36 and a sequentially numbered receipt 46, including the particular transaction data.

The card holder 36, at the end of the statement period, receives a single statement 48 having all of his charge transactions utilizing the charge card selector card 38 listed sequentially thereon. The card holder 36 then easily reconciles his sequentially numbered receipts, which may be and most likely are from different charge card accepting merchants, with the single statement he receives and the receipts and the statement being reconciled, issues a single a payment 52 to the charge card selector 43 to settle the statement 48.

Figure 5:
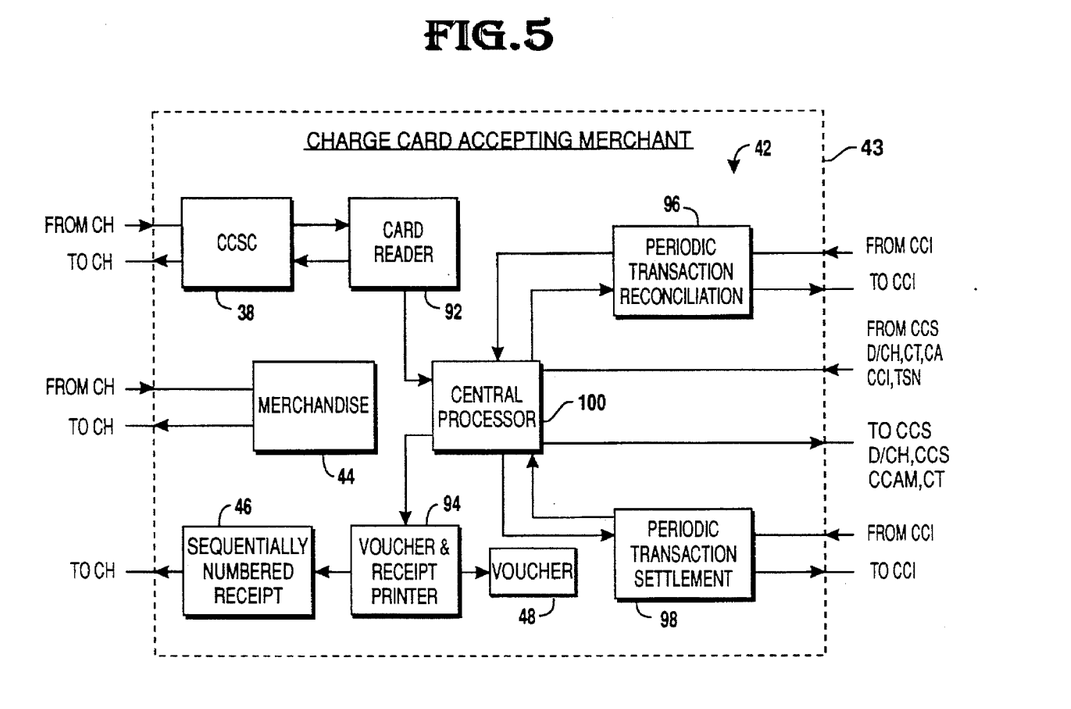
FIG. 5 is a block diagram of the point of charge transaction means at the charge card accepting merchant and its association with the other structure of the invention in practicing the method of the invention.

The point of charge transaction means 40 at the charge card accepting merchant 41 is shown in more detail in FIG. 5. The point of charge transaction means 40 shown in FIG. 5 includes card reader means 92, card holder sequentially numbered, receipt 46 and charge card accepting merchant voucher 48, voucher and receipt printer 94 for printing the card holder receipt 46 and charge card accepting merchant vouchers 48, periodic transaction reconciliation means 96 for periodically reconciling the charge card accepting merchant's charges, as to number and dollar value with the separate selected charge card issuers, as for example charge card issuer 13 settlement means 98, for settling accounts between the charge card accepting merchant 41 and the charge card issuer 13, by electronic funds transfer for example, and central processor means 100 connected to each of the card reader means 92, voucher and receipt printer 94, reconciliation means 96 and settlement means 98 as shown in FIG. 5. In addition, the central processor 100 is connected to the point of charge card selection means 42 at the charge card selector 43 to provide identification and charge transaction data to the point of charge card selection means 42 and to receive identification, charge transaction and credit authorization data from the point of charge card selection means 42.

In accordance with the method of the invention the point of charge transaction means 40 reads the charge card selector card 38 to obtain card holder 36 and charge card selector 43 identification data, generates internally in the central processor identification data for the charge card accepting merchant 41 and charge transaction data which data is transferred to the charge card selector 43 from the central processor 100.

Identification and charge transaction data and the credit authorization data is received by the central processor 100 from the point of charge card selection means 42 and is displayed to the charge card accepting merchant 41 to permit him to authorize or reject the charge transaction.

The central processor means 100 also receives from the point of charge card selection means 42, the sequential number of the charge transaction requested if the charge transaction is authorized. The card holder receipt 46, sequentially numbered for the charge transactions in a particular statement period and a charge card accepting merchant voucher 48 if desired, is printed by the voucher and receipt printer 94 from data supplied by the central processor 100.

The charge transaction is then completed by the charge card accepting merchant 41 by returning the charge card selector card 38 the merchandise 44 which is the subject of the charge transaction and the charge transaction receipt sequentially numbered to the card holder 36.

Periodically, the charge card accepting merchant's vouchers 48 are reconciled with the charge card issuers who authorized the charge transaction reflected thereon through the reconciliation means 96. Similarly, settlement of amounts owing the charge card accepting merchant from the charge card issuer is accomplished by electronic funds transfer through the settlement means 98.

Figure 6:
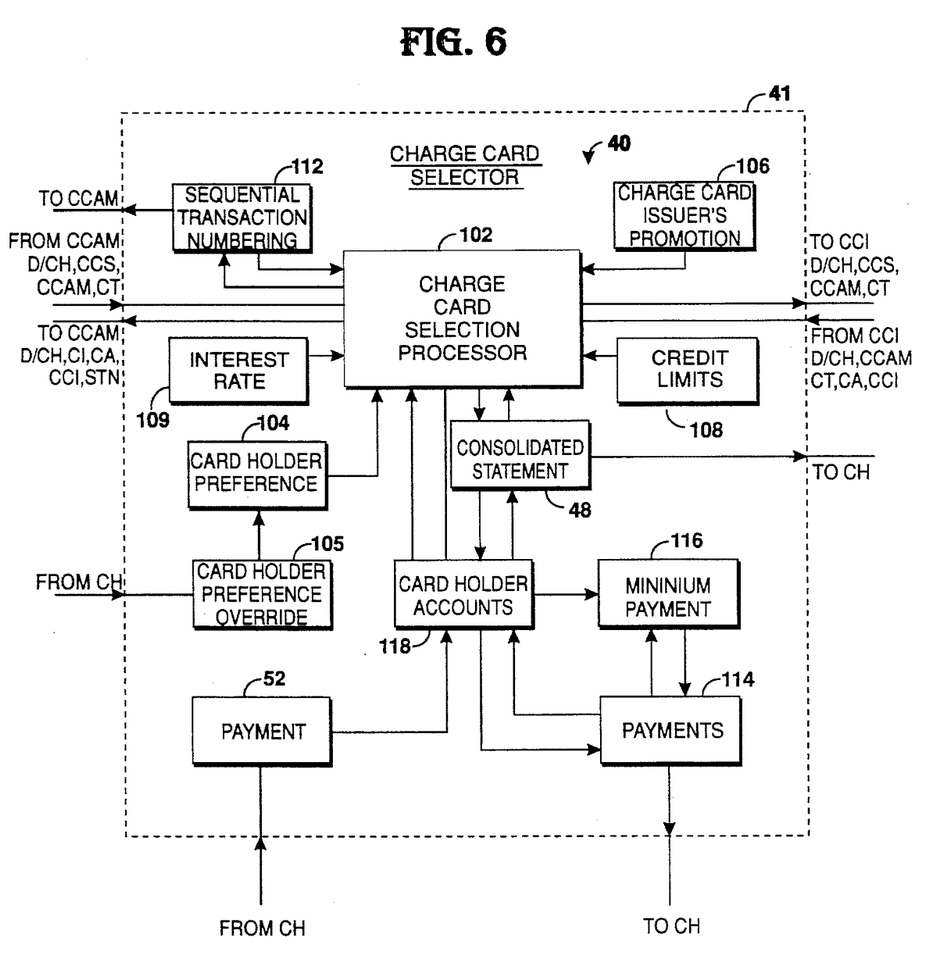
FIG. 6 is a block diagram of the point of charge card selection means at the charge card selector and its association with the other structure of the invention in practicing the method of the invention.

The point of charge card selecting means 42 at the charge card selector 43 as more specifically shown in FIG. 6 includes the card holder preference means 104, card holder preference override means 105, the charge card issuer is promotion means 106, the credit limits protection means 108 and interest rate means 109, all connected to the charge card selection processor 102, for selection of a specific charge card of a plurality of charge cards held by the card holder 36 against which it is desired to charge a particular charge transaction.

The card holder preference means 104 may be altered in accordance with outside information provided by the card holder, as for example by a phone, for a specific charge transaction through the card holder preference override means 105, connected to receive the direct information from the card holder and to the card holder preference means 104.

As shown in FIG. 6, the charge card selection processor 102 is connected to the charge card accepting merchant 41 through the point of charge transaction means 40 to receive card holder, charge card selector and charge card accepting merchant identification and charge transaction data, and to transfer this data to the selected charge card issuer as for example, charge card issuer 13, including point of credit authorization means 12.

The payment means 52 in the point of charge card selection means 42 at the charge card selector 43 receives the payment from the card holder 36. The payment means 114 in the point of charge card selection means 42 is connected to make periodic payments to each of the separate charge card issuers 13, 15, 17, 19, 21, and 23, in accordance with charge transactions charged to their respective charge cards 24, 26, 28, 30, 32, and 34, issued to the card holder 36 against which charge transactions have been charged during a statement period.

The minimum payment protection means 116 of the point of charge card selection means 42 is connected to the card holder accounts 118 and payment out means 114 to insure minimum payments are made to each of the charge card issuers as required by the individual charge card issuer's and the card holder's account, with the separate charge card issuers as reflected in the card holder's accounts means 118 connected to the charge card selection processor 102.

In accordance with the method of the invention the point of charge card selection means 42 receives identification data and charge transaction data from the point of charge transaction means 40 and transmits the data received to the selected charge card issuer selected through the charge card selection processor 102. The point of charge card selection means 42 subsequently receives identification data and credit authorization data from the selected charge card issuer and transfers the data received to the point of charge transaction means 40 through the charge card selection processor 102 along with the sequential number of the charge transaction data.

The selecting of the particular charge card for a charge transaction to be charged to by the charge card selection processor 102 is accomplished in accordance with a predetermined charge card preference made by the card holder, and any override of such preference from the card holder preference means 104 and card holder preference override means 105, as well as credit limit protection provided by the credit limit protection means 108, charge card interest rate means 109 and charge card issuer promotion means in accordance with data placed in the charge card issuer's promotion means 106 at the point of charge card selection means 42.

The credit limit means 108 in operation, alters the charge card selection made by the charge card selection processor 102, in accordance with the credit limits on the card holder's charge cards and the card holder's accounts with the separate charge card issuers as maintained in the card holder accounts means 118.

Periodically, a consolidated statement including all charge transactions for a predetermined statement period is produced by the consolidated statement means 48 to include thereon the sequential numbering of all of the charge transactions by a card holder 36 for the statement period.

Should a credit authorization be refused by a preferred charge card issuer, the preference is switched to the next preferred charge card issuer until authorization is obtained. Refusal of authorization is noted on the card holder's next statement. In addition, all merchant overrides of preferred charge cards, and or direct transactions with the charge card issuers to bypass selection of a preferred charge, are noted on the periodic statements.

Subsequently, payment is received from the card holder 36 and separate payments are made to the separate charge card issuers, in accordance with instructions from the charge card holder and the minimum payment requirements of the charge card issuers.

Figure 7:
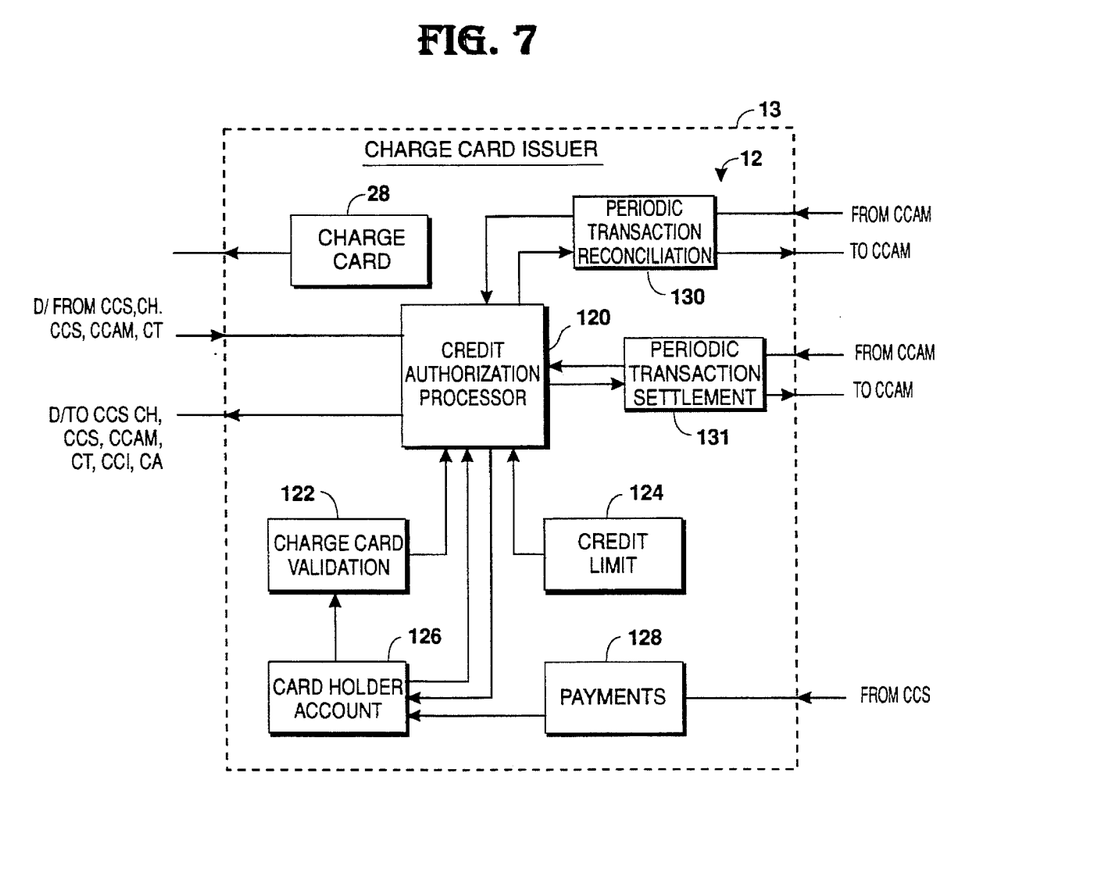
FIG. 7 is a block diagram of the point of credit authorization means at the separate charge card issuers and its association with the other structure of the invention in practicing the method of the invention.

The point of credit authorization means 12 at the charge card issuer 13, as shown in FIG. 7, includes credit authorization processor means 120 receiving card holder, charge card selector, charge card accepting merchant identification and charge transaction data from the charge card selector 43 through the point of charge card selection means 42 and for transferring card holder, charge card accepting merchant, and charge card issuer identification and charge transaction and credit authorization data, to the charge card selector 43.

Credit authorization is made in the credit authorization processor 120 with information provided from the charge card validation means 122, credit limit means 124 and card holder's account means 126, all connected to the credit authorization processor 120 as shown. The card holder's account means 126 is kept current in accordance with payments means 128, receiving periodic payment from the charge card selector 43, and information exchanged with the credit authorization processor 120.

Periodic transaction reconciliation with the charge card accepting merchant 41 is effected by the charge card issuer through the periodic transaction reconciliation means 130 connected to the credit authorization processor 120 and to the point of charge transaction means 40. Similarly, periodic settlement of accounts between the charge card issuer and the charge card accepting merchant 41, may be made through the periodic transaction settlement means 131.

Thus, it can be seen that in accordance with the above described structure for and method of facilitating a charge transaction, a card holder of a plurality of separate charge cards issued by a plurality of charge card issuers may, through the use of a single charge card selector card, make a plurality of charge transactions during a statement period chargeable to any of the charge cards issued to the card holder.

In addition, the card holder will receive a sequentially numbered receipt for all charge transactions utilizing the card holder's charge card selector card during a statement period and a single consolidated statement, having all of the charge transactions during a statement period also sequentially listed thereon, whereby reconciliation of the card holder's receipts and the consolidated statement and settlement with a single payment is facilitated. Also, the charge card issuers may receive a single separate payment from the charge card selector rather than numerous payments from their separate charge card holders.

Figure 8:
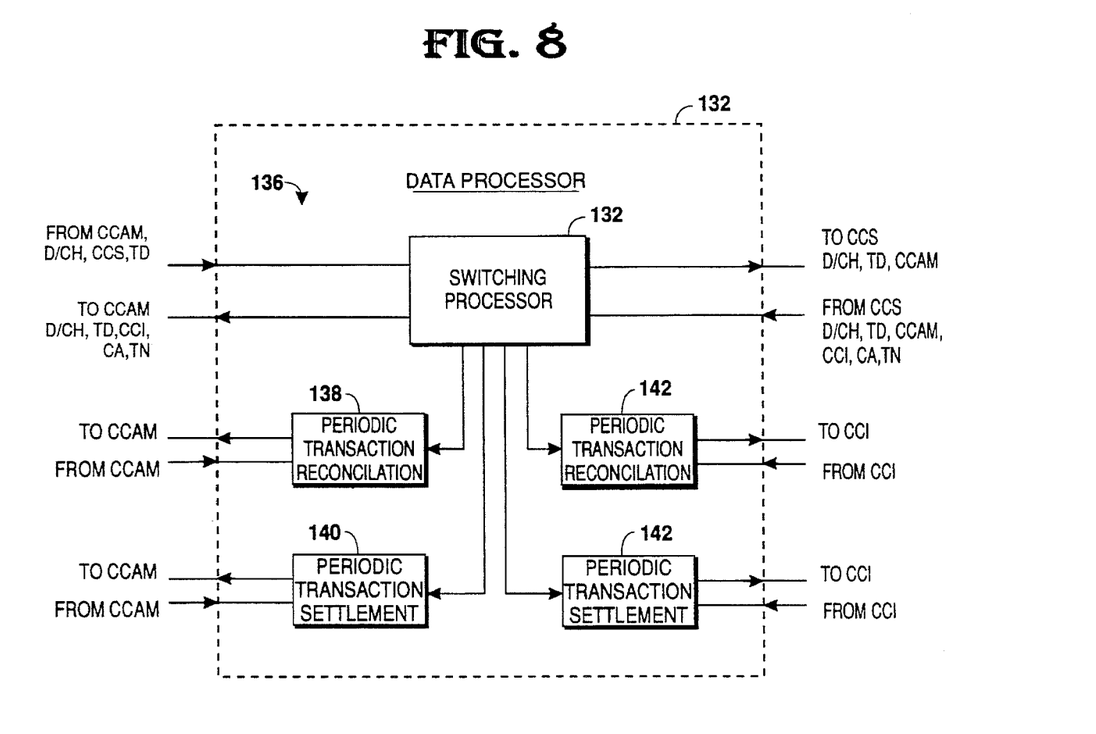
FIG. 8 is a block diagram showing data processing means at a data processor which may be utilized in a modification of the structure and method of the invention and its association with the other structure and method of the invention in practicing the method of the invention.

In a modification of the improved structure for and method of facilitating a charge transaction disclosed in detail above, a separate data processor 132 as shown in FIG. 8, including data processing means 134, is positioned between the charge card accepting merchant 41, including the point of charge transaction means 40, and the charge card selector 43, including the point of charge card selection means 42.

The data processing means 134, shown best in FIG. 8, includes switching processor 136 for receiving card holder, charge card selector and charge card accepting merchant identification and charge transaction data from the charge card accepting merchant 41, point of charge transaction means 40, and passing the card holder, charge card accepting merchant and charge transaction information to the charge card selector 43, point of charge card selection means 42 and for receiving from the point of charge card selection means 42, card holder, charge card accepting merchant, charge card issuer, charge transaction and credit authorization data from the point of charge card selection means 42 and transferring it, less the charge card accepting merchant data to the charge card accepting merchant.

In addition, the periodic transaction reconciliation means 138 transfers data to the point of charge transaction means 40 and receives data allowing daily reconciliation of the number and dollar value of the charge transactions effected by the data processor 132 for the charge card accepting merchant 41, for example on a daily basis. The periodic transaction settlement means 140 transfers data to the charge card accepting merchant 41 and receives data from the charge card accepting merchant to permit periodic settlement of accounts with the charge card accepting merchant 41 by the data processor 132 as by electronic funds transfer. Similarly, the periodic transaction reconciliation means 142 and the periodic transaction settlement means 144 permits reconciliation of transactions between the data processor 132 and the charge card selector on a daily basis and settlement of accounts between the data processor and the charge card selector on a daily basis.

Thus, the data processor 132, through the data processing means 134, processes data between the charge card accepting merchant 41 and the charge card selector 43 and is effective to relieve the charge card issuers it serves from the necessity of the daily reconciliation and settlement of transactions with each charge card accepting merchant individually.

While one embodiment of the present invention, and a modification thereof, have been disclosed in detail, it will be understood that other embodiments and modifications are contemplated. Thus, for example charge authorization is not essential if the charge card accepting merchant is off-line or if the merchant overrides the credit card selection and charges to his own credit card, as long as the charge card selected is the result of the charge card selector card. Further, reconciliation and settlement of accounts may be through the charge card selector. Also, the separate charge card issuers may not decide to issue separate cards but only establish charge accounts with the card holders all being issued charge card selector cards with additional personal identification numbers and account numbers thereon. Further, U.P.C. codes can be placed on the charge card selector cards and used to control coupon use at participating merchants. It is therefore the intention to include all modifications and embodiments of the invention as are included in the appended claims within the scope of the invention.

What is claimed is:

1. Structure for facilitating a charge transaction by a card holder of a plurality of charge cards, issued by a plurality of different charge card issuers, at a charge card accepting merchant, which charge transaction may be charged against any of the card holder's charge cards, utilizing a single charge card selector, charge card selector card, comprising:

a not smart charge card selector card issued to the card holder including at least card holder identification data;

point of charge transaction means at the charge card accepting merchant including, means for obtaining the identification dam from the charge card selector card, means for generating data representing the charge card accepting merchant and the charge transaction, and means operably associated with the means for obtaining and the means for generating data for receiving the identification and charge transaction data and transferring the data to the charge card selector and, means for receiving credit authorization data;

point of charge card selection means at the charge card selector operably associated with the point of charge transaction means including, means for receiving the identification and charge transaction data, charge card selection processor means operably associated with the data receiving means for selecting a predetermined one of the plurality of different charge card issuers, in accordance with the card holder's predetermined selections, means operably associated with the charge card selection processor means for transferring the card holder identification and transaction representing data from the charge card selection processor means to the selected predetermined one of the plurality of different charge card issuers and;

point of credit authorization means at the selected one of the plurality of different charge card issuers operably associated with the point of charge card selection means at the charge card selector including credit authorization means for receiving the identification and charge transaction data from the point of charge card selection means, generating credit authorization data and transferring the means for credit authorizing data to the point of charge transaction means at the charge card accepting merchant;

whereby a charge transaction may be accomplished by the card holder of a plurality of charge cards which may be charged to any of the plurality of charge cards utilizing only a single charge card selector card.

2. Structure as set forth in claim 1 and further including;

means operably associated with the means for selecting a predetermined one of the plurality of different charge card issuers for influencing the selection of the charge card issuer in accordance with at least one of the card holder's overrides, charge cards interest rates and credit limits, and charge card issuer's promotions.

3. Structure as set forth in claim 1 and further including;

means in the point of charge card selection means at the charge card selector operably associated with the charge card selection processor means for generating data representing sequential numbering of charge transactions utilizing the charge card selection card and transferring the data representing sequential numbering of each charge transaction to the charge card accepting merchant and;

means at the charge card accepting merchant operably associated with the means for transferring the data representing sequential numbering of each charge transaction to the charge card accepting merchant for generating and issuing to the card holder a charge transaction receipt, including charge transaction representing data for the particular charge transaction and the sequential number of the particular charge transaction utilizing the particular charge card selection card, for use in subsequent reconciliation of receipts with charges on a consolidated sequentially numbered statement from the charge card selector.

4. Structure as set forth in claim 1 and further including;

means at the charge card selector operably associated with the charge card selection processor means for periodically generating and issuing to each holder of a charge card selector card a consolidated statement of the transactions utilizing the card holder's particular charge card selector card during the period.

5. Structure as set forth in claim 4 and further including;

means at the charge card selector operably associated with the means for periodically generating and issuing consolidated statements for generating data representing sequential numbering of charge transactions utilizing the charge card selector card and transferring the data representing sequential numbering of charge transactions to the means for periodically generating and issuing consolidated statements and, wherein the means for periodically generating and issuing consolidated statements includes means for receiving the data representing sequential numbering of charge transactions and means for sequentially numbering each charge on each consolidated statement to facilitate card holder's reconciliation of sequentially numbered receipts from charge card accepting merchants with the consolidated statement.

6. Structure as set forth in claim 1 and further including;

means at the charge card selector for receiving a periodic payment from each card holder of a charge card selector card, allocating the payment in accordance with the card holder's predetermined preferences to the separate charge card issuers of a card holder's charge cards, and periodically sending a separate payment reflecting the predetermined preferences, modified by at least minimum payment requirements of the separate charge card issuers, to the separate charge card issuers.

7. Structure as set forth in claim 1 and further including;

data processing means operably associated with the point of charge transaction means and point of charge card selection means including, means for receiving identification and transaction representing data from the means for transferring the identification and transaction representing data in the point of charge transaction means, means for transferring the identification and transaction representing data to the charge card selector and means for receiving credit authorization data from at least one of the charge card selector and plurality of different charge card issuers and transferring it to the charge card accepting merchant.

8. Structure as set forth in claim 7 wherein the means for authorizing credit for the charge transaction includes;

means for transferring credit authorization data directly to the data processing means.

9. Structure as set forth in claim 7 wherein the means for authorizing credit for the charge transaction includes;

means for transferring credit authorization data to the charge card selector issuer and to the means for receiving credit authorization data for the charge transaction at the data processor, through the point of charge card selection means.

10. The method of accomplishing a charge transaction by a holder of a plurality of charge cards, issued by a plurality of different charge card issuers, at a charge card accepting merchant, including point of charge transaction means, which charge transaction may be charged against any of the card holder's charge cards, utilizing a single charge card selector, not smart charge card selector card comprising the steps of:

obtaining a charge card selector card having at least card holder identification data thereon and presenting the charge card selector card and merchandise it is desired to purchase utilizing a charge transaction to a charge card accepting merchant at the point of charge transaction means by the card holder;

obtaining the identification data on the charge card selector card at the point of charge transaction means, generating and adding charge transaction data and charge card accepting merchant identification data to the identification data from the charge card selector card in the point of charge transaction means and transferring the identification and charge transaction data to the charge card selector;

receiving the card holder and charge card accepting merchant identification and charge transaction data by the charge card selector in the point of charge card selection means, selecting a predetermined one of the plurality of different charge card issuers in the point of charge card selection means, in accordance with the card holder's predetermined preferences, and transferring charge card holder and charge card accepting merchant identification and transaction representing data to the predetermined one of the plurality of charge card issuers;

receiving the card holder and charge card accepting merchant identification and transaction representing data by the predetermined one of the plurality of charge card issuers in the point of credit authorization means, determining credit authorization for the card holder and generating credit authorizing data in the point of credit authorization means and;

transferring the credit authorizing, card holder and credit card accepting merchant identification data to the charge card selector;

receiving the credit authorization and identification data from the predetermined one of the plurality of charge card issuers by the charge card selector and transferring the credit authorization data and card holder identification to the credit card accepting merchant by the charge card selector;

whereby a charge transaction may be accomplished by the holder of a plurality of charge cards which may be charged to any of the plurality of charge cards utilizing only a single charge card selector card.

11. The method as set forth in claim 10 and further including the step of;

sequentially numbering the charge transactions utilizing a particular charge card selector card in a predetermined statement period by the charge card selector, transferring the sequential number for each charge transaction to the charge card accepting merchant and providing the card holder a receipt with the sequential number for each charge transaction for subsequent reconciliation with a consolidated statement.

12. The method as set forth in claim 10 and further including the step of:

periodically generating and issuing a single consolidated statement of the charge transactions charged to all of the card holder's charge cards during the period to each card holder by the charge card selector.

13. The method as set forth in claim 12 and further including the step of;

sequentially numbering each charge transaction on the consolidated statement utilizing the charge card selector card in a predetermined statement period by the charge card selector.

14. The method as set forth in claim 10 and further including the step of;

periodically receiving a payment from the charge card holder by the charge card selector, allocating the payment to charge card issuers in accordance with the card holder's predetermined preferences and minimum payment requirements of the charge card issuers and making a payment to each of the separate charge card issuers by the charge card selector.

15. The method of accomplishing a charge transaction as set forth in claim 10 and further including the steps of;

transferring the identification and charge transaction data to a data processor by the charge card accepting merchant;

accepting the identification and charge transaction data from the charge card accepting merchant by the data processor, forwarding card holder and charge card accepting merchant identification and transaction representing data to the charge card selector by the data processor, and;

receiving card holder and charge card accepting merchant identification, transaction representing data and credit authorization data from the charge card selector by the data processor.

16. The method as set forth in claim 15 wherein;

the credit authorization is directly transferred to the data processor from the predetermined one of the plurality of charge card issuers.

17. The method as set forth in claim 15 wherein;

the credit authorization is transferred to the data processor through the charge card selector from the predetermined one of the plurality of charge card issuers.

\* \* \* \* \*